US 8,300,611 B2

(12) United States Patent
Nandagopalan

(10) Patent No.: US 8,300,611 B2
(45) Date of Patent: Oct. 30, 2012

(54) METHOD AND APPARATUS TO PROVIDE AIR TIME FAIRNESS IN MULTIPLE PHYSICAL TRANSMISSION RATE WIRELESS SYSTEMS

(75) Inventor: Sai Shankar Nandagopalan, San Diego, CA (US)

(73) Assignee: Konlinklijke Philips Electronics N.V., Eindhoven (NL)

( * ) Notice: Subject to any disclaimer, the term of this patent is extended or adjusted under 35 U.S.C. 154(b) by 520 days.

(21) Appl. No.: 10/565,664

(22) PCT Filed: Jul. 22, 2004

(86) PCT No.: PCT/IB2004/051282
§ 371 (c)(1),
(2), (4) Date: Jul. 14, 2006

(87) PCT Pub. No.: WO2005/011208
PCT Pub. Date: Feb. 3, 2005

(65) Prior Publication Data
US 2007/0025289 A1 Feb. 1, 2007

Related U.S. Application Data

(60) Provisional application No. 60/489,685, filed on Jul. 24, 2003, provisional application No. 60/529,790, filed on Dec. 16, 2003.

(51) Int. Cl.
*H04W 4/00* (2009.01)
*H04W 72/00* (2009.01)
(52) U.S. Cl. ......... 370/338; 370/329; 370/328; 455/453

(58) Field of Classification Search ............... 370/395.4, 370/468, 235, 338, 329, 328; 455/453
See application file for complete search history.

(56) References Cited

U.S. PATENT DOCUMENTS

2002/0041566 A1 4/2002 Yang et al.
2002/0183039 A1 12/2002 Padgett et al.
2003/0133427 A1* 7/2003 Cimini et al. ................. 370/338

FOREIGN PATENT DOCUMENTS
EP 1 227 626 A2 7/2002

OTHER PUBLICATIONS

"Achieving MAC Layer Fairness in Wireless Packet Networks", by T. Nandagopal et al., pp. 87-98.
"A Generalized Processor Sharing Approach to Flow Control in Integrated Services Networks: The Single-Node Case", by A. Parekh et al., vol. 1, No. 3, Jun. 1993, pp. 344-357.

* cited by examiner

*Primary Examiner* — Kamran Afshar
*Assistant Examiner* — Omoniyi Obayanju
(74) *Attorney, Agent, or Firm* — Larry Liberchuk

(57) ABSTRACT

A method for providing bandwidth fairness in a wireless network includes determining bandwidth requirement for a particular service interval for each of a plurality wireless stations in a network. The method also includes determining an allocated transmission time for each of the plurality of wireless stations based on a minimum physical transmission rate. Additionally the illustrative method includes fragmenting a packet of at least one of the wireless stations if the at least one wireless station transmits at other transmission rates that are less than the minimum physical transmission rate. An apparatus is adapted to effect the illustrative method.

16 Claims, 2 Drawing Sheets

METHOD AND APPARATUS TO PROVIDE AIR TIME FAIRNESS IN MULTIPLE PHYSICAL TRANSMISSION RATE WIRELESS SYSTEMS

CROSS REFERENCE TO RELATED APPLICATION

This application claims the benefit of U.S. provisional application Ser. No. 60/489,685 filed Jul. 24, 2003 and U.S. provisional application Ser. No. 60/529,790 filed Dec. 16, 2003 both of which are incorporated herein in whole by reference.

The use of wireless technology in traditionally wired systems has become more commonplace. For example, wireless networks for computers have been implemented in links traditionally reserved for wired connections.

As wireless links become more commonly employed, the need to better handle wireless traffic between access points and wireless stations/nodes increases. Illustratively, in a wireless network such as a wireless local area network (WLAN), there are at least three types of traffic that can occur. A first type is referred to as uplink traffic, which refers to the transmission of content from a wireless station to an access point. A second type is referred to as downlink traffic, which refers to the transmission of content from an access point to a wireless station. The third type is known as sidelink traffic, which refers to the transmission of content from one wireless station to another.

Unfortunately, particular deleterious issues may arise with respect to downlink traffic from an access point to a wireless station. When communicating with a particular wireless station, ensuring adequate airtime and bandwidth fairness to the other stations often becomes a problem. For example, the access point might receive multiple streams of content from a distributed system, each of which is destined for a different wireless station. Not only must the access point determine the order in which to transmit the streams to their respective wireless stations, but also the access point must be sure not to allocate too much bandwidth and airtime to one wireless station.

However, given the mobile nature of wireless stations, fairness is not easily accomplished. This is especially true for mobile networks that have different physical transmission rates. Examples of such networks are Generalized Packet Radio Service (GPRS) and Wireless Local Area Networks (WLAN). In these networks, the stations and access point (base station in case of GPRS Network) communicate at different physical transmission rates based on the distance to the access point (base station in case of GPRS network).

For example, under the I.E.E.E. 802.11b standard, there are at least four rates of communication within a WLAN; namely, 11 Mb/s, 5.5 Mb/s, 2 Mb/s and 1 Mb/s. In case of IEEE 802.11a WLAN there are eight different physical transmission rates ranging from 6 Mb/s to 54 Mb/s. In the IEEE 802.11b WLAN protocol, as a wireless station migrates or moves away from its access point, the physical rate of communication therewith will drop. This is such that, a first wireless station in close proximity to the access point might receive data at the 11 Mb/s rate, while a second wireless station that is moving away from the access point might only receive data at the 5.5 Mb/s or 2 Mb/s or 1 Mb/s rate depending on the station's distance from access point. For the sake of example assume that the station moved far away and its transmission rate is 1 Mb/s.

Because the second wireless station moved away and lowered its physical transmission rate to 1 Mb/s, the time to transmit its MAC frame increases by 1 times (because of lowering its transmission rate from 11 Mb/s to 1 Mb/s). As such, during the transition time of this frame, the other wireless stations will have to wait for a relatively longer time before they can access the wireless medium and transfer their date frames. This results in the packets' from the other stations missing their transmission deadlines and also lowering their throughput. Since all stations experience lower throughputs because of one station's moving away, the system throughput is reduced.

As can be readily appreciated, these delays can result in an unacceptable level of disruption in the servicing of wireless stations within the network. For example, video and audio content are typically delay sensitive meaning that they cannot tolerate delays; and are not loss sensitive meaning that they can afford to lose some of their frames. This is in contrast to data content such as electronic mail and FTP traffic, which is loss sensitive, but not delay sensitive. Thus, delayed transmission of packets and frames result in an unacceptable level of Quality of Service (QoS) for various types of traffic, including but not limited to audio and video types of traffic. This is particularly problematic when the network becomes heavily loaded.

In view of the foregoing, there exists a need for a way to provide airtime and bandwidth fairness to wireless stations for downlink traffic without causing delayed transmission of packets or frames thus satisfying their quality of service (QoS) needs. For example, a need exists for an access point that is capable of transmitting successive packets to a single wireless station without adversely impacting traffic to other wireless stations in the network.

In accordance with an example embodiment, a method of providing bandwidth fairness in a wireless network includes determining bandwidth requirement for a particular service interval for each of a plurality wireless stations in the network. The method also includes determining an allocated transmission time for each of the plurality of wireless stations based on a minimum physical transmission rate. Additionally the illustrative method includes fragmenting a packet of at least one of the wireless stations if the at least one wireless station transmits at other transmission rates that are less than the minimum physical transmission rate.

In accordance with another example embodiment, a wireless network includes at least one access point and a plurality of wireless stations. Illustratively, in each service interval, the access point allocates a transmission time for each of the wireless stations based on their transmission requirements at a minimum physical transmission rate that is fixed for the service interval.

The invention is best understood from the following detailed description when read with the accompanying drawing figures. It is emphasized that the various features are not necessarily drawn to scale. In fact, the dimensions may be arbitrarily increased or decreased for clarity of discussion.

Figure 1:
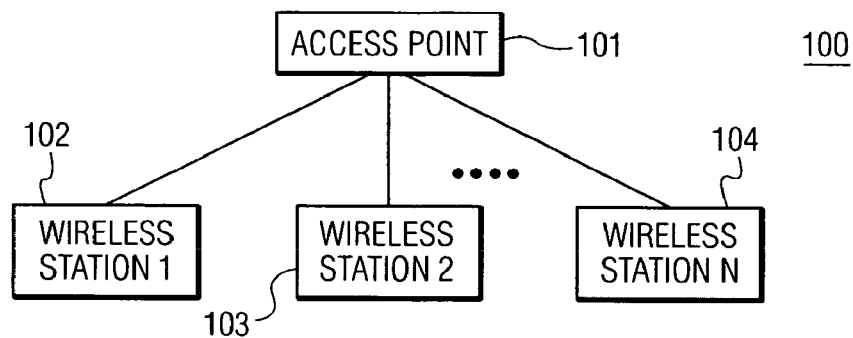
FIG. 1 is a schematic view of a distributed wireless network in accordance with an example embodiment.

In the following detailed description, for purposes of explanation and not limitation, example embodiments disclosing specific details are set forth in order to provide a thorough understanding of the present invention. However, it will be apparent to one having ordinary skill in the art having had the benefit of the present disclosure, that the present invention may be practiced in other embodiments that depart from the specific details disclosed herein. Moreover, descriptions of well-known devices, methods and materials may be omitted so as to not obscure the description of the present invention. Finally, wherever practical, like reference numerals refer to like features.

Briefly, as described in connection with illustrative embodiments herein, methods and apparati that provide airtime fairness in wireless networks having multiple physical transmission rates are disclosed. In accordance with an example embodiment, the fair air time is the time that is allocated to a station based on the traffic characteristics of the downstream station that was admitted and is equal to servicing all packets generated in the beacon interval divided by a minimum physical transmission rate as said in the previous paragraph.

For purposes of comparison, in a known system, if a first wireless station moves away from its original location to a location where its transmission rate is one-half of its original rate, if allowed to transmit the packet completely, it would take up twice the user time it has been allotted. In the meantime, a second wireless station would 'wake-up' and be unable to transmit to the access point until the second wireless station has completed its transmission. Stated differently, the transmission times of the packets of station 2 are now shifted by 2 units of real time. This will likely result in a quality of service (QoS) violation of stream 2 as the packets may miss their "deadlines." Accordingly, the quality of service (QoS) for the second station is diminished, and the overall throughput of the wireless network or system is reduced as well.

Contrastingly, in accordance with an illustrative embodiment, only the QoS of the second station, and not the first station, is reduced. To this end, the example embodiment provides transmission capability based on transmission time at a particular transmission rate based on the need. In the present example embodiment, the access point allocates one packet transmission time for the first station, and three times the packet transmission time the second station. As such, the transmission time of the first station has been set by the access point to be one-third of that of the second. If the first station moves from the access point and its transmission rate is halved as a result, because it has a set time to transmit regardless of it position/movement within the network, its stream will be the only one affected. To wit, the 'unmoved' stations will continue to transmit at their set rate and sequence, and their QoS is unaffected by the movement of the other stations.

In the present example embodiment, the first station will fragment the packet into two or multiple packets of equal length based on how many times its physical transmission rate was lowered. It will then transmit its first fragment or a first few fragments in the allocated time, and thereafter the second station will begin its transmission at its appointed time, and thus, without delay. Thus, regardless of the movement of another station(s) in the system, the QoS of any wireless station that has maintained its physical transmission rate at the minimum physical transmission rate in a particular session will remain the same. Beneficially, therefore, in accordance with example embodiments, fairness is achieved through the initial allocation of a transmission time to each wireless station based on need.

FIG. 1 shows a wireless system 100 in accordance with an example embodiment. The wireless system 100 may be one of a plurality of wireless system in a distributed wireless system (not shown). The wireless system 100 includes an access point 101 (AP), a first wireless station 102, a second wireless station 103, and an $N^{th}$ wireless station 104, where N is an integer and N≧3.

The wireless stations 102-104 may be any suitable device connected to the distributed network by a wireless link. For example, the wireless stations may be mobile computers, personal digital assistants, portable appliances such as cellular GPRS phones, UWB devices, or wireless devices in general. Moreover, the example embodiments are not confined to GPRS and WLAN networks but to all networks where the stations and the central controller (i.e., APs in WLAN and base stations in GPRS) communicate at different physical transmission rates. Ultra Wide Band (UWB) systems that are also being standardized may also incorporate multiple physical rate transmission between the different stations.

The AP 101 is a well-known element in the art of wireless networking. In accordance with example embodiments, the AP 101 may be selected from a standard type access point device for the particular protocol chosen. The AP 101 functions as the transmitter and receiver of packets to and from the wireless stations of the system 100, as well as the scheduling device. For example, the AP 101 includes selects the airtime requirements for each of the wireless stations, and allocates this time to each of the stations. Moreover, the AP 101 provides the communications from one wireless station to another. To wit, the AP 101 may receive a packet from wireless station 102 to be sent to wireless station 104 via a downlink. The AP 101 will then hold this packet until the appropriate time for a downlink transmission to the wireless station 104.

The wireless system 100 provides wireless communications between the base stations 102-104 and the access point 101 within the system 100, and between elements of the system 100 and a distributed system. Moreover, and characteristically, the wireless system 100 provides is a system wherein there are multiple physical transmission rates. For example, systems which follow the IEEE 802.11b have at least four rates of communication within a WLAN; namely, 11 Mb/s, 5.5 Mb/s, 2 Mb/s and 1 Mb/s. In the IEEE 802.11a WLAN standard, there are eight different physical transmission rates ranging from 6 Mb/s to 54 Mb/s. Of course, the referenced IEEE protocols are merely illustrative, and other systems, which provide for multiple physical transmission rates may be used. These include, but are not limited to the new Bluetooth™ standard, namely IEEE 802.15.3, as well as the illustrative networks referenced above. According to these and other protocols, when a wireless station migrates or moves away from its access point, the physical rate of communication of this station will drop to a set rate determined by the magnitude of the movement. These and other details of the illustrative embodiments of the system will become clearer as the present description continues.

In operation, in a particular wireless session, the first wireless station 102 may require a transmission of 1 Mbit of data, the second station 103 may require a transmission of 2 Mbit of data, and the Nth station may require a transmission of 3 Mbit of data. In this session, the AP 101 will determine the amount of time required by each station for the completion of the session based on a particular transmission rate, often referred to as the minimum physical transmission rate. The rate chosen by the AP is based on the agreement between the AP and the flow that is requesting the QoS. The allocation of time for each station is negotiated between AP and stations. After determining this allocation, the specific packet transmission time is set for each of the wireless stations. As will become clearer as the present description continues, in order to maintain fairness and to provide an improved overall transmission rate of the wireless network or system as well, once these allocations are set, they remain fixed until the end of the session, when new allocations may be made. An example of the allocation is described presently in connection with an example embodiment.

In an example embodiment, a session includes a requirement from the first wireless station 102 needs to transmit 1 Mbit of data via the AP 101, the second station 103 needs to transmit 2 Mbit of data via the AP 101, and the Nth station 104 (N=3 in this embodiment) needs to transmit 3 Mbit of data via the AP 101. Each of these stations sends these requests via an initializing packet to the AP 101. Illustratively, the protocol is IEEE 802.11, and the maximum transmission rate is 11 Mb/s.

The AP 101 will calculate the time to transmit a packet using the following relation: Time-to-transmit a packet=packet length/Minimum Physical transmission rate. As such, the respective times to transmit a packet is calculated by the AP 101 and communicated to the respective wireless stations 102-104.

In this example embodiment, the third station 104 is allotted three times more airtime than the first station 102, and the second station 103 is allotted twice the airtime as 101. After the allocation, suppose station 102 moves away from the AP 101, or undergoes a reduction in its physical transmission rate for some other reason. According to the protocol, the physical transmission rate must drop. For example, suppose the allocation is based on a transmission rate of 11 Mb/s, and the station 102 moves far enough that its transmission rate is now 5.5 Mb/s. In this case it will take twice as long for the station to send the I Mbits of data. According to the example embodiment, the station 101 will fragment the packet into two packets for transmission in two separate transmissions. To this end, in the present example, when queried by the AP, the first station 101 will transmit for it allotted time, and thus will send one fragment. At the end of this transmission, the second station 103 (for example) will 'wake-up' and transmit for its allotted time, and similarly the third station 104 will transmit for its allotted time.

In the present example embodiment, the second and third stations have not moved or have not undergone a reduction in its physical transmission rate for some other reason, and have thus completed their transmissions for this session. However, the first station 102 has not finished, and must transmit the second fragment during a segment of a duration equal to its allotted time. This may happen during the next access opportunity. It may also be the case that the original packet is fragmented to 'n' small packets and this mobile station that moved and lowered its physical transmission rate can choose a subset k (k<=n) and transmit in its original allocated time.

Beneficially, because of the time allocation of the example embodiment, the QoS of second and third is not diminished by the movement of the first station 102. To this end, because the time for transmitting is set for each station at the beginning of each transmission session, regardless of the movement of the stations, each station may wake-up at an appointed time to begin its transmission. If one or more stations move or undergoes a reduction in its physical transmission rate for some other reason, each of these stations must fragment its packet(s) for transmission in multiple events.

As can be appreciated, because the movement of one wireless station does not adversely impact the transmission of other stations in the particular session, the overall throughput of the entire network is not significantly lowered. Thus, in accordance with an example embodiment, back-to-back packet transmission is guaranteed without substantially affecting the QoS requirements of the streams from other wireless stations present in the network and also reduces throughput degradation in the network.

Figure 2:
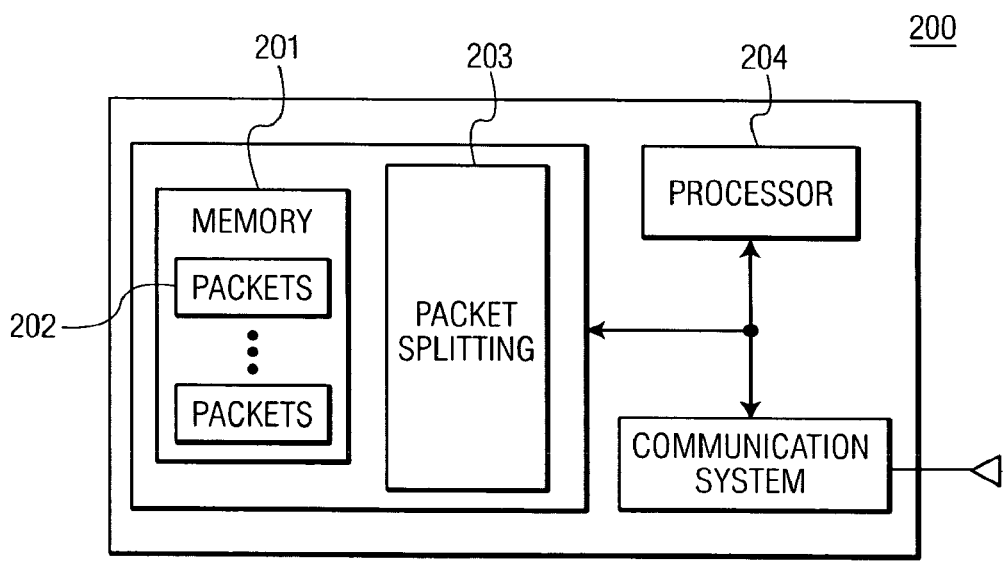
FIG. 2 is a schematic block diagram of a wireless station in accordance with an example embodiment.

FIG. 2 shows a wireless station 200 in accordance with an example embodiment. The wireless station 200 may be one of the wireless stations 102-104 shown in FIG. 1. Furthermore, it is noted that in order to not obscure the description of the example embodiments, the wireless station 200 of FIG. 2 shows only the germane elements to the example embodiments. Of course, depending on the type of device, many other elements will be included. For example, the wireless station 200 may be a mobile computer or PDA. In this case the elements germane to the present description are but a small portion of the elements of the overall device.

The wireless station 200 includes a memory 201, which includes, among other data, the packets 202 that are transmitted. The wireless station 201 also includes a packet splitting section 203, which splits the packets into fragments for sending over multiple allocated transmission times. The wireless station 200 also includes a processor 204 and a communications system 205. The processor is a known microprocessor that is useful in the ordering of transmissions, timing and other functions required in the transmission and reception of packet data over the wireless network.

In operation, if the wireless station moves away from the AP or undergoes a reduction in its physical transmission rate for some other reason, its transmission rate will lower in accordance with the requirements of the protocol under which the network functions. In this case, the processor 204 will send commands to the packet splitting section 203 to split the packet into the number of fragments needed to complete the transmission. For example, if the transmission rate is reduced by a factor of four, the processor will command the packet splitter to split the fragments into four fragments for transmission over four separated transmissions, with each transmission taking one period of allocated airtime.

In the header of the first fragment transmitted by the wireless station 200, a bit is provided to indicate to the receiver (AP) that it will receive three additional fragments at later times of transmission. In the transmission of the last fragment, the more fragment bit will be reset to indicate that this is the last fragment.

It is noted that in an example embodiment, once a 'moved' station moves back closer to the AP and has its physical transmission rate greater than the minimum physical transmission rate it can send its packets successfully without degrading its own QoS and this results in better system throughput.

Figure 3:
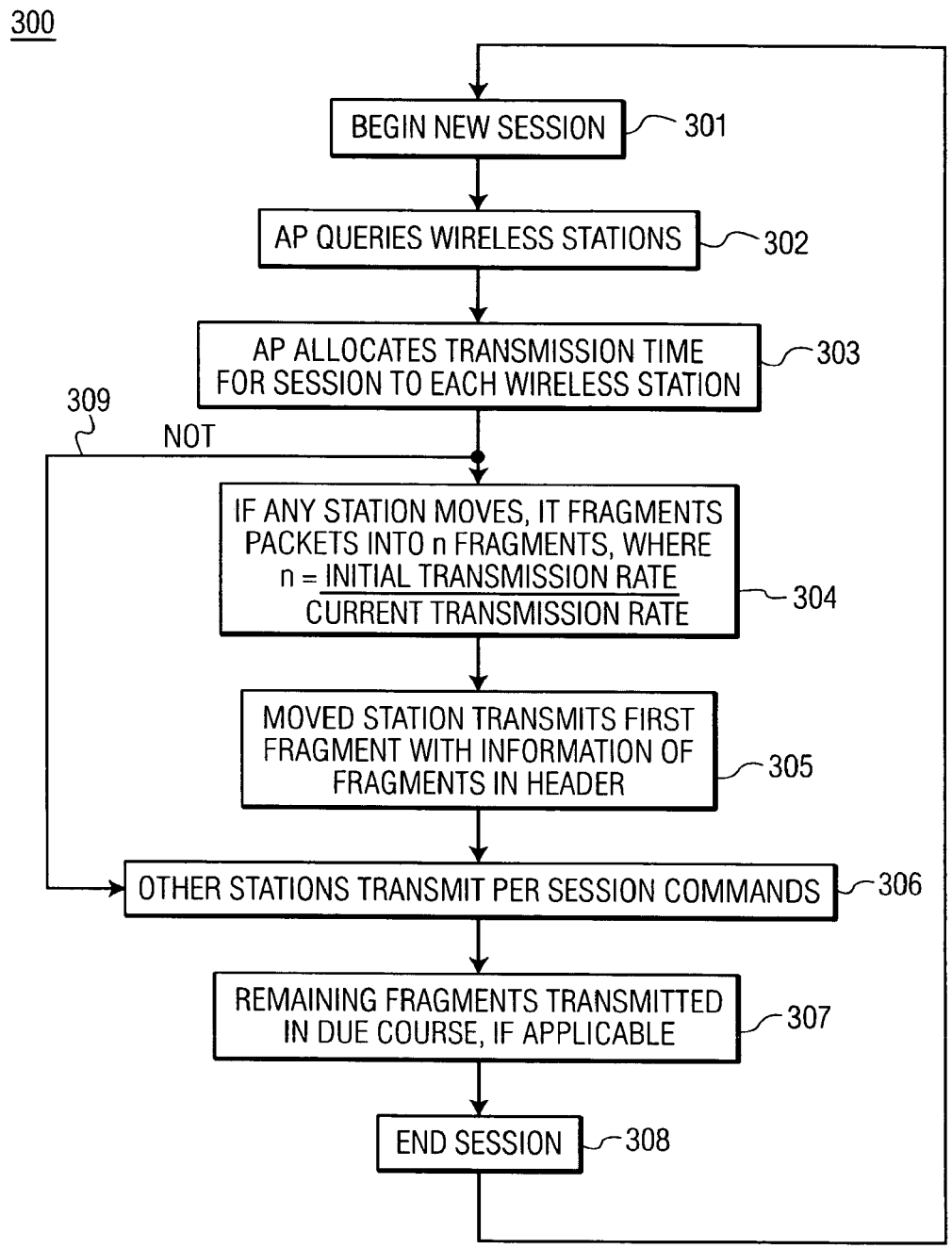
FIG. 3 is a flow chart of a method of providing airtime fairness in accordance with an example embodiment.

FIG. 3 is a flow chart of an illustrative method 300 used for uplink and downlink traffic in a wireless network, such as the network of FIG. 1. In keeping with the previously described embodiments, the method 300 may function under one of a variety of protocols, and characteristically includes multiple physical transmission rates within its network of operation. As such, many of the concepts and principles that govern distributed wireless networks, the network 100 and the wireless station 200 apply to the method 300 as well. In the interest of clarity of description, most of these concepts and principles are not repeated in the description of the illustrative method.

At step 301, a new communication session begins between the AP and the plurality of wireless stations in the network. At Step 302 the AP queries the wireless stations as to their bandwidth requirements for the current session. At Step 303, the AP allocates airtime, or transmission time for each of the wireless stations for the present session. This allocation is determined based on a particular minimum physical transmission rate, and is determined simply by dividing the bandwidth need by the minimum physical transmission rate. Illustratively, the transmission rate used in this calculation is the maximum rate allowed under the protocol.

Step 304 is begins the sub-method followed in the network in the event that one or more of the stations moves during the session or undergoes a reduction in its physical transmission rate for some other reason, resulting in a change in the transmission rate of the moved station(s). As can be seen, in the event no stations move, the sequence follows route 309 as shown.

In step 304, each moved station will likely have to change its respective transmission rate to a new rate, which is lower than the transmission rate of step 303. Again, these transmission rates are per the protocol governing the system. In order to not deleteriously impact the QoS of the other stations in the network, the moved stations must fragment their packets in order to send each fragment within the allocated transmission time. As can be readily determined, the number of fragment into which the packet of the moved stations is equal to the initial transmission rate (e.g., of Step 303) divided by the new, lower transmission rate of the particular station(s). Illustratively, if the initial transmission rate used by the AP to determine the transmission time allocation in Step 303 is 11 Mb/s, and a station moves to a location where it is mandated by the protocol to transmit at 1 Mb/s, the packet must be fragmented into 11 fragments.

At Step 305, at its scheduled transmission time the moved station(s) transmits the first fragment, which includes in the header the total number of fragments to be transmitted in the current session. Since this station has moved away it does not have enough time to transmit its full packet and will transmit its fragments after all stations that have maintained transmission at the agreed rate are finished. In an example embodiment, the station that moved or underwent a reduction in its physical transmission rate for some other reason will transmit its fragments until its physical transmission rate is greater than the agreed minimum physical transmission rate.

At Step 306, the remaining stations execute respective dialogs with the AP, per the scheduling of the session by the AP. It is noted that other stations that have may have moved or have undergone a reduction in physical transmission rate for some other reason, and have fragmented packets into the required number of fragments per Step 304. These stations would follow Step 305 at their appointed time for dialog with the AP. In all, each station will function under the arranged schedule under Step 306.

Upon the termination of all other scheduled dialogs, each station will transmit its remaining fragments until all fragments are transmitted. The scheduling is determined by the AP and communicated to the moved stations during servicing intervals set by the protocol. Finally, once all fragments are transmitted, the session is terminated, and at an appropriate time a new session begins as at Step 301.

As can be appreciated, the allocation of a transmission interval to each wireless station fosters the maintaining of scheduled dialogs, and the maintaining of a certain QoS level for each of the stations in a network that have not changed their transmission from the minimum physical transmission rate. As such, if a station does not move, its QoS does not suffer because other stations move to locations where their transmission rate is lowered. Moreover, the overall throughput of the network session, while not optimal if one or more stations move, is, nonetheless, not reduced to the extent it would be if the moved station could complete a transmission at a lower rate.

The invention having been described in detail in connection through a discussion of exemplary embodiments, it is clear that modifications of the invention will be apparent to one having ordinary skill in the art having had the benefit of the present disclosure. Such modifications and variations are included in the scope of the appended claims.

The invention claimed is:

1. A method of providing bandwidth fairness in a wireless network that includes a plurality of wireless stations that share the wireless network bandwidth during a particular service interval, the method comprising:
determining bandwidth requirement for the particular service interval for each of the wireless stations;
determining an allocated transmission time for each of the wireless stations based on a set physical transmission rate, wherein each of the wireless stations has individually allocated transmission time based on at least the quantity of data that needs to be transmitted within the service interval by each of the wireless stations; and
fragmenting a packet by at least one of the wireless stations if the at least one wireless station transmits at a transmission rate that is lower than the set physical transmission rate,
wherein the allocated transmission time is equal to the total data of all packets generated in the beacon interval divided by the set physical transmission rate.

2. The method as recited in claim 1, wherein the allocated time for each of the plurality of wireless stations is proportional to the quantity of data to be sent by the respective stations during the service interval.

3. The method as recited in claim 1, wherein for each of the at least one wireless station a number of the fragments is equal to the set physical transmission rate divided by the lower transmission rate.

4. The method as recited in claim 1, wherein the wireless network is a multiple physical transmission rate wireless network.

5. The method as recited in claim 4, wherein the wireless network is a Generalized Packet Radio Service (GPRS) network.

6. The method as recited in claim 4, wherein the wireless network is a Wireless Local Area Network (WLAN).

7. The method as recited in claim 1, wherein each of the at least one wireless stations transmits all remaining fragments after all wireless stations that transmit at the set physical transmission rate have completed transmitting their packets.

8. The method as recited in claim 7, further comprising maintaining a particular quality of service QoS for each of the wireless stations that maintain transmission at the set physical transmission rate during a service interval.

9. The method as recited in claim 1, wherein each of the at least one wireless stations transmits all remaining fragments until its physical transmission rate is greater than the set physical transmission rate.

10. A wireless network, comprising:
at least one access point; and
a plurality of wireless stations that share the wireless network bandwidth during a service interval, wherein in the service interval, the access point allocates a transmission time for each of the wireless stations based on their transmission requirements at a set physical transmission rate that is fixed for the service interval, wherein each of the wireless stations has individually allocated transmission time based on at least the quality of data that needs to be transmitted within the service interval by each of the wireless stations; and wherein the plurality of wireless stations transmit at the set physical transmission rate; and wherein if any of the plurality of wireless stations change their transmission rate to a lower transmission rate than the set physical transmission rate during the service interval, each of the wireless stations that change their transmission rate fragment their respective packets into two or more fragments of equal length, wherein the allocated transmission time is equal to the total data of all packets generated in the beacon interval divided by the set physical transmission rate.

11. The wireless network as recited in claim 10, wherein the number of fragments is equal to the lower transmission rate divided by the set transmission rate.

12. The wireless network as recited in claim 10, wherein each of the plurality of wireless stations is adapted to transmit at multiple physical transmission rates.

13. The wireless network as recited in claim 12, wherein the wireless network is a Generalized Packet Radio Service (GPRS) network.

14. The wireless network as recited in claim 12, wherein the wireless network is a Wireless Local Area Network (WLAN).

15. The wireless network as recited in claim 10, wherein a particular quality of service (QoS) is maintained for each of the plurality of wireless stations that transmit at the set physical transmission rate for the entire service interval.

16. The wireless network as recited in claim 10, wherein each of the wireless stations that change their transmission rate to a lower transmission rate than the set physical transmission rate during the service interval send their remaining fragments after all wireless station that transmit at the set transmission rate have completed transmission of their respective packets.

* * * * *